United States Patent
Simmons

(10) Patent No.: US 6,383,258 B1
(45) Date of Patent: May 7, 2002

(54) COPOLYIMIDE GAS SEPARATION MEMBRANES

(75) Inventor: John W. Simmons, Wilmington, DE (US)

(73) Assignee: L'Air Liquide Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/740,286

(22) Filed: Dec. 19, 2000

(51) Int. Cl.⁷ .......................... B01D 53/22; B01D 71/64
(52) U.S. Cl. ............... 95/45; 95/51; 96/14; 210/500.39
(58) Field of Search ................................ 95/45, 47–55; 96/8, 10, 14; 210/500.39

(56) References Cited

U.S. PATENT DOCUMENTS

| | | | |
|---|---|---|---|
| 4,690,873 A | 9/1987 | Makino et al. ........... 428/473.5 |
| 4,705,540 A | 11/1987 | Hayes ............................ 55/16 |
| 4,717,393 A * | 1/1988 | Hayes ............................ 95/51 |
| 4,717,394 A * | 1/1988 | Hayes ........................ 95/51 X |
| 4,880,442 A * | 11/1989 | Hayes ............................ 95/51 |
| 4,932,982 A * | 6/1990 | Hayes ............................ 95/51 |
| 4,981,497 A * | 1/1991 | Hayes ............................ 95/51 |
| 5,042,992 A | 8/1991 | Blinka et al. .................... 55/16 |
| 5,042,993 A * | 8/1991 | Meier et al. ................. 96/14 X |
| 5,055,116 A * | 10/1991 | Kohn et al. ................ 95/51 X |
| 5,061,298 A * | 10/1991 | Burgoyne, Jr. et al. ..... 96/14 X |
| 5,074,891 A * | 12/1991 | Kohn et al. ................ 96/14 X |
| 5,076,816 A * | 12/1991 | Avrillon et al. ................. 95/51 |
| 5,076,817 A * | 12/1991 | Hayes ........................ 95/51 X |
| 5,112,941 A * | 5/1992 | Kasai et al. ................ 96/14 X |
| 5,165,963 A * | 11/1992 | Matsumoto et al. ........ 95/51 X |
| 5,178,650 A * | 1/1993 | Hayes ........................ 95/51 X |
| 5,232,472 A | 8/1993 | Simmons et al. ............... 55/16 |
| 5,234,471 A * | 8/1993 | Weinberg .................. 95/51 X |
| 5,266,100 A * | 11/1993 | Simmons .................... 96/14 X |
| 5,286,539 A * | 2/1994 | Kusuki et al. ......... 210/500.39 |
| 5,320,650 A | 6/1994 | Simmons ........................ 96/14 |
| 5,334,697 A * | 8/1994 | Simmons .................... 96/14 X |
| 5,391,219 A * | 2/1995 | Matsumoto et al. ........... 95/51 |
| 5,591,250 A | 1/1997 | Stern et al. ..................... 95/51 |
| 5,618,334 A * | 4/1997 | Ozcayir et al. ................. 96/14 |
| 5,702,503 A * | 12/1997 | Tang .......................... 95/51 X |
| 5,922,104 A * | 7/1999 | Park et al. ..................... 95/51 |
| 5,928,410 A * | 7/1999 | Jois et al. ....................... 95/51 |
| 5,969,087 A * | 10/1999 | Maeda ...................... 96/14 X |
| 5,972,080 A * | 10/1999 | Nagata ...................... 96/14 X |

FOREIGN PATENT DOCUMENTS

JP  61-133117 A  *  6/1986  .................... 95/51

* cited by examiner

Primary Examiner—Robert H. Spitzer
(74) Attorney, Agent, or Firm—Jeffrey C. Lew

(57) ABSTRACT

A gas separation membrane is formed from a copolyimide produced by copolymerization of monomers which include o-tolidine sulfone, at least one other hydrophilic diamine and 2,2-bis(3,4-dicarboxyphenyl)hexafluoropropane dianhydride. One or more additional aromatic dianhydrides can optionally be included. The novel membrane exhibits an excellent combination of high selectivity of gases to be separated from a gas mixture, high permeability and strong solvent resistance to hydrocarbon chemicals. The membrane is therefore useful in separating gases from gas mixtures in which vapor or liquid hydrocarbon contaminants are present, for example in the separation of carbon dioxide from methane and/or nitrogen in the purification of natural gas.

21 Claims, No Drawings

COPOLYIMIDE GAS SEPARATION MEMBRANES

FIELD OF THE INVENTION

This invention relates to gas separation membranes comprising a copolyimide and the process for separating one or more gases from a gaseous mixture using such membranes.

BACKGROUND OF THE INVENTION

Many industrial gas separation processes utilize selectively gas permeable membranes. Aromatic copolyimides have been suggested for use as the membrane material in some gas separations. Certain aromatic copolyimide membranes have been developed to provide high relative selectivities for one gas over another gas permeating through the membrane. Such membranes, however, suffer from having low gas permeation rates. On the other hand, different copolyimide gas separation membranes have much higher gas permeation rates, but they exhibit correspondingly lower relative gas selectivities.

In addition to good gas separation characteristics, commercially important processes often impose other formidable demands on the membrane material. For example, the purification of natural gas involves the separation of carbon dioxide from methane and/or nitrogen in the presence of liquid and gaseous hydrocarbons that contaminate the mixtures to be separated. The membrane material in this use should be highly resistant to the solvent effect of the hydrocarbon contaminants. Another important consideration is that the material should be easily fabricated into an appropriate membrane structure.

It is desirable to have a copolyimide gas permeation membrane which has both high selectivity and high gas permeation rates for gases being separated. It is also desirable that such a copolyimide membrane additionally has a strong resistance to hydrocarbon solvent activity. It is still further desired to have a copolyimide material that is readily fabricable to form membrane structures while preserving its combination of high selectivity, high gas flux and resistance to hydrocarbons U.S. Pat. No. 4,690,873 discloses a gas separating material of copolyimide formed from recurring units of tetracarboxylic acids and moieties derived from diaminodimethyl-diphenylene sulfone ("AMPS") isomers, which include the compound o-tolidine sulfone ("TSN"). A glossary of selected chemical compounds referenced in this application is found in Table III, below. The compositions do not include 2,2-bis(3,4-dicarboxyphenyl)hexafluoropropane dianhydride ("6FDA"). The product membranes exhibit very high selectivity of carbon dioxide relative to methane but the carbon dioxide permeability is quite low.

U.S. Pat. No. 4,705,540 discloses polyimide gas separation membranes in which the membrane composition is polymerized from mixtures containing aromatic diamines and 4,4'-(hexafluoroisopropylidene)-bis(phthalic anhydride). This produces polyimides with extremely rigid chains. The monomer mixtures do not include blends of o-tolidine sulfone with other hydrophilic diamines. The membranes demonstrate very high carbon dioxide permeability but rarely carbon dioxide/methane selectivity above 25.

U.S. Pat. No. 5,042,992 discloses a gas separation material which is a polyimide formed by reacting 4,4'-(hexafluoroisopropylidene)-bis(phthalic anhydride) ("6FDA") with diamino-dialkyldiphenylenesulfone. The material can form into membranes that have both high carbon dioxide permeability and high carbon dioxide/methane selectivity. The patent does not disclose a monomer mixture also containing a second, hydrophilic diamine, and further, it does not mention whether the polyimides are resistant to hydrocarbon solvents.

U.S. Pat. No. 5,591,250 discloses a process for separating carbon dioxide from a methane using a membrane of polyimide formed by reacting monomers of the single dianhydride 6FDA and one or more diamines. The use of o-tolidine sulfone as one of the diamines is not disclosed. Only rarely among the many examples are both high carbon dioxide permeability and high carbon dioxide/methane selectivity demonstrated. The resistance of the membranes to hydrocarbon solvents is not reported.

SUMMARY OF THE INVENTION

The present invention now provides a gas separation membrane of a copolyimide composition which advantageously provides a favorable combination of high selectivity and high transmembrane flux for commercially important gas mixtures while remaining resistant to attack from hydrocarbon chemicals. The copolyimide of the gas separation membrane is formed by copolymerization of monomers comprising o-tolidine sulfone, a hydrophilic diamine other than o-tolidine sulfone, and 2,2-bis(3,4-dicarboxyphenyl)hexafluoropropane dianhydride. Optionally, one or more aromatic dianhydride can be included in the monomers utilized to form the membrane. The copolyimide is readily fabricable to a membrane form suitable for gas separation.

There is also provided a process for separating component gases of a gas mixture comprising the steps of
(a) providing a gas separation membrane of a polyimide formed by copolymerization of diamine monomers and dianhydride monomers in which the diamine monomers comprise o-tolidine sulfone and a hydrophilic diamine other than o-tolidine sulfone, and the dianhydride monomers comprise 2,2-bis(3,4-dicarboxyphenyl)hexafluoropropane dianhydride,
(b) contacting the gas mixture on one side of the membrane to cause the component gases to selectively permeate the membrane, and
(c) removing from the opposite side of the membrane a permeate gas composition enriched in concentration of the component gases which are more preferentially permeable through the membrane.

The process of this invention is well suited to separating commercially important gases from gas mixtures and is especially valuable for separating carbon dioxide from methane and/or nitrogen in the purification of natural gas. The novel copolyimide gas separation membrane is advantageously resistant to hydrocarbon contaminants likely to be present in crude natural gas such as cycloalkanes, represented by cyclohexane, cycloheptane, cyclooctane, methylcyclohexane, methylcyclopentane and 1,2-dimethylcyclopentane, and aromatic hydrocarbons represented by benzene, toluene and xylene.

DETAILED DESCRIPTION

The present invention involves a gas separation membrane formed from a copolyimide composition. Generally stated, the copolyimide is produced by conventional process steps in which firstly a diamine and a dianhydride undergo polycondensation reaction to form a polyamic acid. Subsequently, the polyamic acid is dehydrated to obtain a polyimide. It has been discovered that production of the copolyimide from a particular selection of diamine and dianhydride monomers provides a gas separation membrane which exhibits superior gas separation, flux and hydrocarbon resistance properties.

At least two diamine monomers are utilized. One is 3,7-diamino-2,8-dimethyl diphenylsulfone, commonly known as "o-tolidine sulfone" and, as mentioned, is sometimes referred to as "TSN". At least one other diamine monomer is a hydrophilic diamine. The hydrophilic diamine can be aromatic, aliphatic or a combination of both. Preferably, the hydrophilic diamine has structure of formula I, as follows:

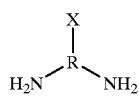

I in which R is an aromatic hydrocarbon radical of 6–24 carbon atoms, an aliphatic hydrocarbon radical of 3–12 carbon atoms or a mixture thereof, and X is a hydrophilic radical. By "hydrophilic radical" is meant that the pendant X group is highly polar. Great preference is given to hydrophilic diamine of formula I in which X is —OH, —SO$_3$H, —CO$_2$H, —NHR$_1$, —NR$_2$R$_3$, or a mixture thereof, in which each of R$_1$, R$_2$, and R$_3$ is an alkyl or aryl group. Combinations of such hydrophilic diamines are also contemplated and preferred. Representative hydrophilic diamines include 1,3-diamino-2-hydroxypropane ("DAHP"), 1,3-diaminobenzene-4-sulfonic acid ("HSMPD"), 2,2-bis(3-amino-4-hydroxyphenoxy) hexafluoropropane ("bisAPAF"), 3,3'-dihydroxybenzidine ("HAB"), L-lysine, 1,3-diamino-5-benzoic acid ("DABA"), and mixtures thereof.

TSN is an ingredient in the dianine monomers utilized in all copolyimides of this invention. While not wishing to be bound by a particular theory, it is believed that TSN contributes to an optimized free volume in the polymer structure. This is thought to make the copolyimide highly gas permeable. Strong hydrocarbon solvent resistance and high permselectivity of the resulting copolyimide membrane are attributed to the presence of the hydrophilic diamine comonomer. It has been found that preferably about 20–80 mole %, and more preferably about 40–60 mole % of the total diamine monomers should be hydrophilic diamine and a complementary amount should be TSN.

In one aspect, the monomer mixture from which the copolyimide is derived includes the fluorine-containing aromatic dianhydride 2,2-bis(3,4-dicarboxyphenyl) hexafluoropropane dianhydride, alternatively named 4,4'-(hexafluoroisopropylidene)-bis(phthalic anhydride) and, as mentioned, occasionally referred to as "6FDA" or "6F". In a preferred embodiment, 6FDA is the sole dianhydride reacted with the diamine components to form the copolyimide.

In another aspect, the dianhydride monomer can include one or more other aromatic dianhydrides in addition to and different from 6FDA. Preferably at least about 30 mole % and more preferably at least about 50 mole % of the dianhydride monomers should be 6FDA. Representative aromatic dianhydrides which are suitable for use in this invention include 1,2,4,5-benzene tetracarboxylic dianhydride (i.e., pyromellitic dianhydride or "PMDA"), 3,3',4,4'-benzophenonetetracarboxylic dianhydride ("BTDA"), 3,3',4,4'-biphenyl tetracarboxylic dianhydride ("BPDA"), diphenylsulfone dianhydride ("DSDA"), and bisphenol A dianhydride ("BPADA").

The copolyimide can be made by methods well known in the art. In a preferred process, approximately equimolar amounts of dianhydride and diamine are reacted in a conventional polycondensation and dehydration polymerization scheme. Thermal imidization is preferred because it results in higher molecular weights of the polymer, allowing for easier membrane manufacture. The copolyimides of this invention have a weight average molecular weight of about 23,000 to about 400,000, and more preferably, about 50,000 to about 280,000.

Preferably, the diamines are first dissolved in a polymerization solvent medium and the dianhydride monomer or monomers is then gradually added portion wise under continuous agitation. The amount of solvent used should be sufficient that the concentration of the monomers is within the range of about 10 wt. % to about 30 wt. %, and preferably, about 20% by weight after combining all the monomers. Solvent can be added to achieve the desired concentration, if necessary.

The solvents which may be used in the polymerization process are organic solvents, and preferably anhydrous. The solvents should not react to any appreciable extent with the monomers, intermediates, product or other chemical species involved in the polymerization process. It is desirable that either the dianhydride or diamine monomer portions, and preferably both, are soluble in the solvent. Examples of suitable solvents are N,N-dimethylacetamide ("DMAC"); N-methyl-2-pyrrolidone ("NMP"); gamma-butyrolactone; m-cresol, pyridine; diglyme; and like materials as well as mixtures of such solvents.

Polymerization is conducted under anhydrous conditions while agitating the mixture and maintaining the reaction mass at a temperature below about 50° C., and preferably, in a range of about 20–35° C. The reaction vessel can be immersed in a cooling bath to control the temperature. Polymerization is conducted for a time sufficient to form a polyamic acid having the desired molecular weight. This occurs usually within about 2 to about 20 hours. The polyamic acid may then be thermally converted to the polyimide by heating the polyamic acid solution to about 150–200° C. until imidization is substantially complete. The polyimide may then be recovered from solution by precipitation with alcohol (e.g., methanol) or water and washed with additional alcohol or water.

It is helpful for forming the polymer into a gas separation membrane utilizing conventional techniques that the copolyimide is readily soluble in certain solvents. The preferred solvents are polar aprotic solvents. Representative examples include NMP and DMAC.

To prepare membranes according to this invention, the polymer is dissolved in an appropriate solvent and the solution can then, for example, be cast as a sheet onto a support, or spun through a spinneret to yield a hollow fiber. The solvent is then removed. The technique by which the solvent is removed affects the characteristics of the resulting membrane. For example, evaporating the solvent by heating produces a uniformly dense membrane. By comparison, quenching the film or fiber membrane precursor structure in a liquid which is a nonsolvent for the polymer and miscible with the solvent of the polymer solution will form an asymmetric membrane, i.e., a membrane in which the density varies with distance normal to the membrane surface.

Certain copolyimides according to this invention are not adequately soluble in solvents preferred for industrial processing, such as liquids which are nontoxic, noncorrosive, inexpensive, have proper volatility characteristics and are amply available. For those copolyimides, the novel copolyimide membrane may still be produced by dissolving the polyamic acid precursor in an appropriate solvent, forming the membrane structure as previously mentioned, and then, converting the polyamic acid to copolyimide, for example by heating the membrane structure.

The copolyimide membrane of this invention can be formed into a number of shapes well known in the art. Flat films and hollow fibers are preferred. Flat films can be self supporting within a frame or supported by a substrate which is usually porous. The flat film can be used in flat configuration. Other possible configurations for flat films include winding the film in a spiral form or pleating the film to generate a higher transmembrane surface area per unit volume. Hollow fibers can be bundled in parallel flow arrangement and potted in a tube sheet at each end. The tube sheet is inserted in a typically cylindrical case to form a hollow fiber gas separation membrane module as is well known in the art.

The novel membrane can be used to great advantage for separating gaseous components of gas mixtures. In a general sense this is accomplished by bringing the gas mixture in contact with one side of the membrane and allowing the components of the mixture to permeate through the membrane. Components of the mixture which are more preferentially permeable than other components will pass through more rapidly to form a so-called "permeate" composition on the opposite side of the membrane. The permeate composition will thus be enriched in the faster permeating components. The gas composition on the first side, occasionally referred to as the "retentate" side, will become depleted in the faster permeating components. Frequently, a pressure gradient is imposed across the membrane from high pressure on the retentate side to low pressure on the permeate side. This increases the rate of permeation. The permeate and retentate compositions are withdrawn from the vicinity of the membrane for further processing, storage, use or disposal as called for any particular practical application. Considerations for operating gas separation membrane units is well understood by those of ordinary skill in the art.

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

A 250 mL 3-necked round bottomed flask, equipped with a mechanical stirrer, a nitrogen inlet, and a Dean-Stark trap was flame dried under a nitrogen atmosphere and allowed to cool to ambient temperature. The diamine mixture (0.025 moles total), identified in Table I, was dissolved thoroughly in roughly 80–90 mL of NMP. The aromatic dianhydride or mixture of dianhydrides (0.025 moles), Table I, was then added with an additional 10–20 mL of NMP. The solution was allowed to stir for 2 hours at room temperature. About 30 mL of o-dichlorobenzene (ODCB) or toluene was then added and the solution was heated and held at 150–180° C. for 5–25 hours, for the azeotropic removal of the water. The polymer was then precipitated into water or methanol, ground up in a blender, washed three times with methanol and then twice with water. The polymer was air dried at room temperature overnight, then further dried in a vacuum oven at 150–220° C. for at least 2 hours. Inherent viscosity of each polymer was measured at 25° C. at 0.5 wt./vol. % in NMP and is indicated in Table I.

Each of the polyimides produced as described above were independently dissolved in either NMP or m-cresol to form approximately 20% solutions. A film was cast from each solution onto a glass plate at 100–120° C. with a knife gap of $38 \times 10^{-5}$ m (15 mil). The film was dried on the plate at this temperature for 1–2 hours. The film was then removed from the plate, cooled to room temperature and dried further in air overnight. The film was still further dried in a vacuum oven at about 68 kPa (20 inches Hg) at 220° C. for 18 hours. A film of thickness between $2 \times 10^{-5}$ and $5 \times 10^{-5}$ m (1–2 mils) was thus obtained. The permeabilities at 3.45 MPa (500 psig) and 30° C. of pure carbon dioxide and methane were measured separately for each film. Permeability of carbon dioxide and the membrane selectivity of carbon dioxide relative to methane as calculated by the ratio of pure component permeabilities are stated in Table I.

TABLE I

| Example | Diamine 1 | Diamine 2 | Diamine 1/ Diamine 2 (mol %/mole %) | Dianhydride 1 "DA-1" | Dianhydride 2 "DA-2" | DA-1/DA-2 (mole %/mole %) | Inh. Visc. | Perm. $CO_2$ (barrers) | Perm. $CO_2$/ Perm. $CH_4$ (barrers/barrers) |
|---|---|---|---|---|---|---|---|---|---|
| 1 | TSN | DAHP | 75/25 | 6FDA | — | 100/0 | 0.46 | 47.9 | 58.9 |
| 2 | TSN | HSMPD | 50/50 | 6FDA | — | 100/0 | 0.76 | 88.8 | 59.2 |
| 3 | TSN | HSMPD | 50/50 | 6FDA | BPDA | 50/50 | 0.69 | 163 | 41.6 |
| 4 | TSN | BisAPAF | 50/50 | 6FDA | — | 100/0 | 0.64 | 46.8 | 56.5 |

TABLE I-continued

| Example | Diamine 1 | Diamine 2 | Diamine 1/ Diamine 2 (mol %/mole %) | Dianhydride 1 "DA-1" | Dianhydride 2 "DA-2" | DA-1/DA-2 (mole %/mole %) | Inh. Visc. | Perm. $CO_2$ (barrers) | Perm. $CO_2$/ Perm. $CH_4$ (barrers/barrers) |
|---|---|---|---|---|---|---|---|---|---|
| 5 | TSN | BisAPAF | 50/50 | 6FDA | BPDA | 50/50 | 0.85 | 27.0 | 56.3 |
| 6 | TSN | BisAPAF | 25/75 | 6FDA | — | 100/0 | 0.62 | 30.5 | 54.8 |
| 7 | TSN | HAB | 50/50 | 6FDA | — | 100/0 | 0.77 | 34.3 | 64.4 |
| Comp. Ex. 1 | TSN | — | 100/0 | BPADA | — | 100/0 | 0.66 | 13.5 | 40.3 |
| Comp. Ex. 2 | TSN | — | 100/0 | BPDA | — | 100/0 | — | 2.9 | 236[a] |
| Comp. Ex. 3 | BisAPAF | — | 100/0 | 6FDA | — | 100/0 | 0.64 | 20.3 | 45.1 |
| Comp. Ex. 4 | HAB | — | 100/0 | 6FDA | — | 100/0 | — | 5.9 | 76[b] |
| Comp. Ex. 5 | TSN | — | 100/0 | 6FDA | — | 100/0 | 1.08 | 109 | 40.0 |

[a] As reported in U.S. Pat. No. 4,690,873
[b] As reported in U.S. Pat. No. 5,591,250

Examples 1–7 show that many gas separation membranes fabricated in accordance with this invention are able to simultaneously provide high permeability for carbon dioxide of greater than about 25 barrers and high carbon dioxide/methane selectivity of more than about 40. Comparative Examples 1 and 2 involve membranes of polyimides produced from TSN, a dianhydride other than 6FDA and no additional hydrophilic diamine. Comparative Examples 3 and 4 relate to membranes of polyimides free of TSN. Experiments of Comparative Examples 2 and 4 were not run but the results of tests performed and described in U.S. Pat. Nos. 4,690,873 and 5,591,250, which are incorporated by reference herein, are reported in Table I. These comparative membranes exhibited high carbon dioxide/methane selectivity but low carbon dioxide flux. Comparative Example 5 tested a membrane of a TSN/6FDA polyimide which lacked the additional hydrophilic diamine comonomer. The membrane exhibited both high $CO_2$ flux and $CO_2/CH_4$ selectivity. However, resistance to hydrocarbon solvent was inadequate as will be explained next.

Samples which absorb less solvent are deemed to be more resistant to the solvent. Table II shows that membranes of Examples 1, 4 and 5 had very low solvent uptake. While Comparative Examples 6 and 7 membranes made as described above had good, minimal uptake of hexane, they absorbed very large percentages of toluene. The membrane of Comp. Ex. 5 which proved to have both high carbon dioxide flux and high selectivity of carbon dioxide relative to methane also had an acceptable uptake of hexane. However, solvent attack was so severe that this sample was too brittle after immersion in toluene to obtain an uptake measurement.

Altogether, these examples demonstrate that copolyimides of this invention form membranes that provide a unique combination of transmembrane flux, high selectivity and good resistance to hydrocarbon solvents while membranes of compositions lacking one or more of the novel copolyimide membrane components fail to deliver all of these desirable performance characteristics.

TABLE II

| Example | Diamine 1 | Diamine 2 | Diamine 1/ Diamine 2 (mole %/mole %) | Dianhydride 1 "DA-1" | Dianhydride 2 "DA-2" | DA-1/DA-2 (mole %/mole %) | Hexane Uptake (%) | Toluene Uptake (%) |
|---|---|---|---|---|---|---|---|---|
| 1 | TSN | DAHP | 75/25 | 6FDA | — | 100/0 | −0.1 | 7.8 |
| 4 | TSN | BisAPAF | 50/50 | 6FDA | — | 100/0 | 0.5 | 0.5 |
| 5 | TSN | BisAPAF | 50/50 | 6FDA | BPDA | 50/50 | 0.0 | 0.0 |
| Comp. Ex. 5 | TSN | — | 100/0 | 6FDA | — | 100/0 | 1.0 | brittle |
| Comp. Ex. 6 | DAPI | — | 100/0 | BTDA | — | 100/0 | 1.0 | 41.5 |
| Comp. Ex. 7 | DAM | — | 100/0 | MPD | — | 100/0 | 2.8 | 27.5 |

The hydrocarbon solvent resistance of several copolyimides of this invention were compared to conventional polyimides. Separate films each weighing about 1 g of the materials to be tested were immersed in toluene or hexane at room temperature for 24 hours. Then the samples were removed from the solvent, lightly dabbed with a piece of adsorbent material until the sample appeared free of surface liquid by visual inspection and weighed. The amount of solvent retained by each sample after immersion as a percentage of initial, solvent free weight was then calculated. These solvent uptake results are reported in Table II.

Although specific forms of the invention have been selected for illustration in the preceding description in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

TABLE III

| | | |
|---|---|---|
| 6FDA | 2,2-bis(3,4-dicarboxyphenyl) hexafluoropropane dianhydride or 4,4'-(hexafluoroisopropylidene)-bis(phthalic anhydride) | |
| BisAPAF | 2,2-bis(3-amino-4-hydroxyphenoxy) hexafluoropropane | |
| BPADA | bisphenol A dianhydride | |
| BPDA | 3,3',4,4'-biphenyltetracarboxylic dianhydride | |
| BTDA | 3,3'-4,4'-benzophenonetetracarboxylic dianhydride | |
| DABA | 1,3-diamino-5-benzoic acid | |
| DAHP | 1,3-diamino-2-hydroxypropane | |
| DAM | diaminomesitylene | |
| DSDA | diphenylsulfone dianhydride | |
| HAB | 3,3'-dihydroxybenzidine | |

TABLE III-continued

| | | |
|---|---|---|
| HSMPD | 1,3-diaminobenzene-4-sulfonic acid | [structure: benzene ring with two NH₂ groups and SO₃H] |
| L-lysine | | [structure: H₂N-(CH₂)₄-CH(NH₂)-CO₂H] |
| MPD | m-phenylene diamine | |
| PMDA | 1,2,4,5-benzene tetracarboxylic dianhydride | [structure of pyromellitic dianhydride] |
| TSN | 3,7-diamino-2,8-dimethyldiphenyl sulfone | [structure of dibenzothiophene sulfone with two CH₃ and two NH₂ groups] |

What is claimed is:

1. A gas separation membrane of a polyimide formed by copolymerization of monomers comprising o-tolidine sulfone, a hydrophilic diamine other than o-tolidine sulfone, and 2,2-bis(3,4-dicarboxyphenyl)hexafluoropropane dianhydride.

2. The membrane of claim 1 in which the hydrophilic diamine has the formula $(NH_2)_2$—R—X, in which R is a hydrocarbon radical selected from the group consisting of aromatic hydrocarbons of 6–24 carbon atoms, aliphatic hydrocarbons of 3–12 carbon atoms and a mixture thereof, and X is —OH, —COOH, —SO₃H, —NHR₁, —NR₂R₃, or a mixture thereof, and in which each of $R_1$, $R_2$ and $R_3$ is an alkyl or aryl group.

3. The membrane of claim 2 in which the hydrophilic diamine is about 20–80 mole % of the total of o-tolidine sulfone and hydrophilic diamine.

4. The membrane of claim 2 in which the monomers consist essentially of o-tolidine sulfone, one hydrophilic diamine other than o-tolidine sulfone, and 2,2-bis(3,4-dicarboxyphenyl)hexafluoropropane dianhydride.

5. The membrane of claim 2 in which the hydrophilic diamine is selected from the group consisting of 1,3-diamino-2-hydroxypropane, 1,3-diaminobenzene-4-sulfonic acid, 2,2-bis(3-amino-4-hydroxyphenoxy)hexafluoropropane, 3,3'-dihydroxybenzidine, L-lysine, 1,3-diamino-5-benzoic acid, and a mixture thereof.

6. The membrane of claim 5 in which 1,3-diaminobenzene-4-sulfonic acid is about 40–60 mole % of the total of o-tolidine sulfone and hydrophilic diamine.

7. The membrane of claim 1 in which the monomers further comprise an aromatic dianhydride other than 2,2-bis(3,4-dicarboxyphenyl)hexafluoropropane dianhydride.

8. The membrane of claim 7 in which 2,2-bis(3,4-dicarboxyphenyl)hexafluoropropane dianhydride is about 30–99 mole % of the total of dianhydride monomers.

9. The membrane of claim 8 in which the aromatic dianhydride other than 2,2-bis(3,4-dicarboxyphenyl)hexafluoropropane dianhydride is selected from the group consisting of pyromellitic dianhydride, 3,3',4,4'-benzophenonetetracarboxylic dianhydride, 3,3',4,4'-biphenyl tetracarboxylic dianhydride, diphenylsulfone dianhydride, bisphenol A dianhydride, and a mixture of them.

10. The membrane of claim 7 in which the hydrophilic diamine has the formula $(NH_2)_2$—R—X, in which R is a hydrocarbon radical selected from the group consisting of aromatic hydrocarbons of 6–24 carbon atoms, aliphatic hydrocarbons of 3–12 carbon atoms and a mixture thereof and X is —OH, —COOH, —SO₃H, —NHR₁, —NR₂R₃, or a mixture thereof, and in which each of $R_1$, $R_2$ and $R_3$ is an alkyl or aryl group.

11. The membrane of claim 10 in which the hydrophilic diamine is about 20–80 mole % of the total of o-tolidine sulfone and hydrophilic diamine.

12. The membrane of claim 11 in which the hydrophilic diamine is selected from the group consisting of 1,3-diamino-2-hydroxypropane, 1,3-diaminobenzene-4-sulfonic acid, 2,2-bis(3-amino-4-hydroxyphenoxy)hexafluoropropane, 3,3'-dihydroxybenzidine, L-lysine, 1,3-diamino-5-benzoic acid, and a mixture of them.

13. A process for separating component gases of a gas mixture comprising the steps of
   (a) providing a gas separation membrane of a polyimide formed by copolymerization of diamine monomers and dianhydride monomers in which the diamine monomers comprise o-tolidine sulfone and a hydrophilic diamine other than o-tolidine sulfone, and the dianhydride monomers comprise 2,2-bis(3,4-dicarboxyphenyl)hexafluoropropane dianhydride,
   (b) contacting the gas mixture on one side of the membrane to cause the component gases to selectively permeate the membrane, and
   (c) removing from the opposite side of the membrane a permeate gas composition enriched in concentration of the component gases which are more preferentially permeable through the membrane.

14. The process of claim 13 in which the hydrophilic diamine is about 20–80 mole % of the diamine monomers and has the formula $(NH_2)_2$—R—X, in which R is a hydrocarbon radical selected from the group consisting of aromatic hydrocarbons of 6–24 carbon atoms, aliphatic hydrocarbons of 3–12 carbon atoms and a mixture thereof, and X is —OH, —COOH, —SO$_3$H, —NHR$_1$, —NR$_2$R$_3$, or a mixture thereof, and in which each of R$_1$, R$_2$ and R$_3$ is an alkyl or aryl group.

15. The process of claim 14 in which the hydrophilic diamine is selected from the group consisting of 1,3-diamino-2-hydroxypropane, 1,3-diaminobenzene-4-sulfonic acid, 2,2-bis(3-amino-4-hydroxyphenoxy)hexafluoropropane, 3,3'-dihydroxybenzidine, L-lysine, 1,3-diamino-5-benzoic acid, and a mixture of them.

16. The process of claim 13 in which the dianhydride monomers further comprise at least one aromatic dianhydride other than 2,2-bis(3,4-dicarboxyphenyl)hexafluoropropane dianhydride.

17. The process of claim 16 in which 2,2-bis(3,4-dicarboxyphenyl)hexafluoropropane dianhydride is about 30–99 mole % of the dianhydride monomers and the aromatic dianhydride other than 2,2-bis(3,4-dicarboxyphenyl)hexafluoropropane dianhydride is selected from the group consisting of pyromellitic dianhydride, 3,3',4,4'-benzophenonetetracarboxylic dianhydride, 3,3',4,4'-biphenyl tetracarboxylic dianhydride, diphenylsulfone dianhydride, bisphenol A dianhydride, and a mixture of them.

18. The process of claim 13 in which the gas mixture contacting the membrane comprises a hydrocarbon solvent in liquid or gaseous form.

19. The process of claim 18 in which the hydrocarbon solvents are selected from the group consisting of cyclohexane, cycloheptane, cyclooctane, methylcyclohexane, methylcyclopentane and 1,2-dimethylcyclopentane, toluene, benzene and xylene and mixtures thereof.

20. The process of claim 13 in which the gas mixture comprises carbon dioxide.

21. The process of claim 20 in which the gas mixture further comprises a gas selected from the group consisting of methane, nitrogen and a mixture of them.

\* \* \* \* \*